Jan. 15, 1935.   A. W. TRONNIER   1,987,878
PHOTOGRAPHIC OBJECTIVE
Filed Dec. 12, 1933
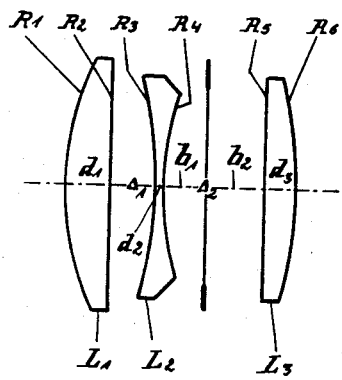
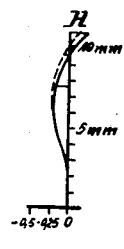
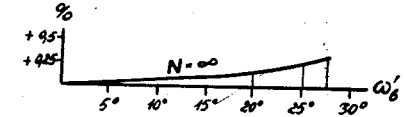
Inventor:
A. W. Tronnier.
by: Hans Hedrich
Attorney.

Patented Jan. 15, 1935

1,987,878

UNITED STATES PATENT OFFICE 1,987,878

PHOTOGRAPHIC OBJECTIVE

Albrecht Wilhelm Tronnier, Kreuznach, Germany

Application December 12, 1933, Serial No. 701,987
In Germany October 13, 1933

1 Claim. (Cl. 88—57)

This invention relates to spherically, chromatically and comatically corrected objectives with anastigmatic flattened field consisting of three components which are in contact with the air, two of which having positive power and different radii of curvature, the third being a dispersive component and has an unsymmetrical shape of a biconcave lens, and is so arranged between said collective components that the two airspaces between the three components are unequal and exert likewise a dispersive effect, the larger space being located at the shorter radius of curvature of said biconcave lens. The diaphragm is, with objectives of this type, generally arranged in the larger of said airspaces.

Objectives of the above-mentioned type are of common use. If the basis of construction is appropriately chosen, these objectives are particularly suited for obtaining an anastigmatic-flattened field over a comparatively large angle and possessing a good spherical correction also as regards larger relative apertures, and it is, with these objectives, possible to keep the spherical longitudinal aberration in general below 0,5% and the differences between the ideal focal plane and the sagittal and the meridional image points are below about 1%. The sine-coincidence-condition can likewise be well fulfilled so that the pictures in the proximity of the optical axis coincide for the various aperture zones not only with respect to their position, but also to the magnitude whereof they are free from inner axial coma. There arise, however, in the lateral parts of the image field indistinctnesses in spite of a satisfying correction of the astigmatism as with larger openings of the lateral pencils, the transmission of the image, in general, is affected with coma, also if the sine-coincidence-condition has been fulfilled. This correction can be brought about in the case of a suitable design of the system for the objective type in question either by giving the total system a great length (height of vertices) or by introducing a collective cemented surface which is convex towards the diaphragm into one of the two collective components—preferably that component which is opposite the image—, the respective component being split into two cemented lenses of adversing power and which consist of glasses with different indices of refraction. There has become known, for instance, by the U. S. A. Patent 1,924,527 and by the German Patent No. 581,472 an objective of the above-mentioned type which can well be corrected for coma, and in which also the other aberrations can be obviated in a measure sufficient for the requirements of photographic objectives.

While with those known objectives the possibility of correcting the coma in the case of a short length of the system is established by combining radii of a certain length with certain kinds of glasses, limiting the combination to the constructional form with a collective cemented surface in the positive component located opposite the image, the present invention permits attaining the above correction with only three lenses which are in contact with the air, the length of this system remaining nevertheless within admissible limits. The comatic lateral aberration can, with this improved objective, be kept below 1,5 per mille for an oblique chief ray (on the image side) of 20° and a relative aperture of the coma pencil of $f/8.8$ in the plane extending through the centre of the entrance pupil, it being predetermined that the image plane coincides with the Gaussian focal plane (see the inventor's publication "Die Abweichungen geneigter Büschel endlicher Öffnung im Meridianschnitt zentrierter Lindensysteme") (= The aberrations of oblique pencils of light aperture in the meridional section of centered lens systems), published in the periodical "Photographische Industrie" (= Photographic industry), Berlin 1933, volume 41, pages 953–956). The effect stated is obtained by a far-reaching approximative fulfilment of the comatic-pupil-condition (see Equation 5 in the above-mentioned publication) for that sub-type of the present type of objectives in which the collective front lens possesses at least the two-fold refractive power of the total system, whereas its combination with the subsequent negative lens possesses at the highest (measured in the absolute value) 0,4 of the refractive power of the total objective, the aperture of which is equal to, or larger than 0.20.

In order to define the characteristic features of the invention the elements of the parallel auxiliary ray are to be used, for which the Schwarzschild measure equation is available.

$$\phi = \sum_{i=1}^{K} \frac{n_i' - n_i}{r_i} h_i = 1$$

where $n_i$ and $n_i'$ are the indices of refraction before and after the radius of curvature $r_i$, and the height of incidence of the parallel auxiliary ray is denoted with $h_i$, and the index $n_i$ is the surface-number from the first to the rear radius of the system. In said equation $\varphi_r$ (surface effect) can be written as a substitute for each of the ($i$)

sum arguments in order to abreviate the expression. If the effect of the $\nu-1$ surfaces preceding the $\nu$ surface is denoted with $$\bar{\varphi}'_{V_{\nu-1}} = \bar{\varphi}_{V_\nu}$$

(rest effect), then as always $$\bar{\varphi}'_{V_\nu} = \bar{\varphi}_{V_\nu} + \bar{\varphi}_{F_\nu} = \bar{\varphi}_{V_{\nu+1}}$$

and the rest-effect, therefore, is the algebraic sum of the surface-effects from the first to the $\nu$-surface of the system and for the transit from the $\nu$-surface to the $\nu+1$ surface there is available for the height of incidence of the parallel auxiliary ray $$h_{\nu+1} = h_\nu' = h_\nu - \delta h_\nu$$

If desired, this is written $$\delta h_\nu = \bar{\varphi}'_{V_\nu} \cdot \frac{d_{\nu,\nu+1}}{n_\nu'}$$

whereby $d_{\nu,\nu+1}$ is the distance between the $\nu$-surface and the $\nu+1$ surface on the optical axis, and $n_\nu'$ is the index of refraction of the medium between these surfaces.

With these effect-values the definition of the new improved system is possible, as the individual surfaces are defined by the effect values not only by their difference between the refractive exponents and their curvatures, but also by their position to the preceding surfaces, so that these values can serve, besides, indirectly (formation of invariants) and directly for the representation of the aberration-coefficients for instance of the third order. According to A. Gleichen the transit value from the $\nu$ surface to the $\nu+1$-surface (i. e. the Seidel-reduction of thickness of the system from the first to the $\nu,\nu+1$-surface) is denoted with $C_\nu$ whereby is valid $$C_\nu = 1 \sum_{\mu=2}^{\nu} \frac{d_\mu - 1}{n_\mu \cdot h_\mu - i h_\mu}$$

and if this is written $$A_\nu = h_\nu(\bar{\varphi}_{F_\nu} m_\nu - \bar{\varphi}_{V_\nu}) \text{ and } \tau_\nu = \frac{1}{A_\nu} + c_\nu$$

then the Seidel-coefficients will be, in this case, successively as follows:

$$SI_\nu = \bar{\varphi}^3_{F_\nu} \alpha_\nu + \bar{\varphi}^2_{F_\nu} \bar{\varphi}_{V_\nu} \beta_\nu + \bar{\varphi}_{F_\nu} \bar{\varphi}^2_{V_\nu} \gamma_\nu + \bar{\varphi}^3_{V_\nu} \delta_\nu$$
$$SII_\nu = SI_\nu \tau_\nu, \quad SIII_\nu = SII_\nu \tau_\nu$$
$$SV_\nu = (SIII_\nu + P_\nu) \tau_\nu$$

It is in view of these relations that the characteristic features of the improved objective within the present sub-type of photographic three-lens objectives as regards the relations of the third powers of three $\bar{\varphi}$- values with respect to the effect-value of the last surface of the total system are claimed. This reference to $\bar{\varphi}_{F6}$ is made with consideration of the influence of this surface and its effect upon the intersection distance $p_0'$ between the vertex of this surface and the focal plane, and of the importance of this distance upon the coma correction according to the Equations 4 and 6 of the above-mentioned publication.

According to this invention, as regards the present sub-type of the triplets such as distribution of the effect-values is provided that the ratio $$\bar{\varphi}^3_{F1} : \bar{\varphi}^3_{F6}$$

lies between the values 22.40 and 11.20, and, besides, the ratio $$\bar{\varphi}^3_{V4} : \bar{\varphi}^3_{F6}$$

lies between the values 11.20 and 5.60, and finally the ratio $$\bar{\varphi}^3_{F6} : \bar{\varphi}^3_{F3}$$

lies between the values 5.60 and 2.80.

The invention is illustrated diagrammatically and by way of example on the accompanying drawing on which Figure 1 shows an objective designed according to this invention and intended for a focal length of $f=200$ mm., and Figures 2a, 2b and 2c, show the curves of the correction for the example.

The designations of the drawing correspond with those of the example, for which numerical data are given, the correction of which, is drawn in the scale used by W. Merté (see the publication of W. Merté in the "Handbuch der wissenschaftlichen und angewandten Photographie") (=Handbook of scientific and applied photography), volume I "Das photographische Objektiv" (=The Photographic Objective), Wien 1932, is added to the respective figure. There is shown in Fig. 2a the spherical and sine-condition aberration in Fig. 2b the aberrations of the sagittal and meridional focal points from the ideal image plane (drawn in full and in dotted lines), and in Fig. 2c the distortion for $N=\infty$. The aberrations in Figs. 2a and 2b are stated in percents of the equivalent focal length, the distortion in Fig. 2c in percents of the image height. The comatic lateral aberration amounts, in the example for the inclination 18° 38' 25.6'' on the object side (with the main ray inclination on the image side of $u_6'=20°$ 14' 5.4'') and as regards the upper and the lower coma ray of + or −5.765 mm. height of incidence (related to $f=100$ mm. focal length) +1.18 or −1.20 per mille of the image height, with the predetermination, that the image plane coincides with the Gaussian focal plane.

The distance between the Gaussian focal plane and the vertex of the last lens on the image side is denoted $p_0'$. The focal length of the numerical example is equal to the unit. The refractive indices stated refer to the violet ray, whereas the color dispersion of the glasses used is characterized by the Abbe number $$\nu = \frac{nD - 1}{n_F - n_C}$$

Data pertaining to the example shown in Fig. 1:
Relative aperture 1:4.5 $p_0'=0{,}8289$
$R_1 = +0.2616$
    $d_1 = 0.04916$, $n_1 = 1.6739$, $\nu_1 = 51.3$.
$R_2 = +12.017$
    $\Delta_1 = 0.03988$ air.
$R_3 = -0.8346$
    $d_2 = 0.01038$, $n_2 = 1.6481$, $\nu_2 = 35.4$.
$R_4 = +0.2567$
    $\Delta_2 = 0.10925$ air, $b_1 = 0.04807$, $b_2 = 0.06118$.
$R_5 = +3.0261$
    $d_3 = 0.02567$, $n_3 = 1.6515$, $\nu_3 = 56.3$.
$R_6 = -0.5479$
It is $$\bar{\varphi}'_{V2} = +2.52381, \text{ thus larger than } 2.0$$

$$\bar{\varphi}'_{V4} = -0.16532, \text{ thus smaller than } 0.4 \text{ abs.}$$

$$\bar{\varphi}^3_{F1} : \bar{\varphi}^3_{F6} = 17.789, \text{ and}$$

$$\bar{\varphi}^3_{V4} : \bar{\varphi}^3_{F6} = 6.9643 \text{ and at the same time}$$

$$\bar{\varphi}^3_{F6} : \bar{\varphi}^3_{F3} = 3.6704.$$

I claim:

A spherically, chromatically and comatically corrected objective with anastigmatic flattened field consisting of three components which are in contact with the air, two of which having positive power and different radii of curvature, the third being a dispersive component and has an unsymmetrical shape of a biconcave lens, and is so arranged between said collective components that the two airspaces between the three components are unequal and exert likewise a dispersive effect, the larger space, in which the diaphragm is generally arranged, being located at the shorter radius of curvature of said biconcave lens, and the collective front lens possesses at least the twofold refractive power of the total system, whereas its combination with the said subsequent negative lens possesses at the highest (measured in the absolute value) 0.4 of the refractive power of the total objective, the aperture of which is equal to, or larger than 0.20, the said objective lens being characterized by such a distribution of the effect-values ($\varphi$ values) that the ratio $$\bar{\varphi}_{r_1} : \bar{\varphi}_{r_2}$$

lies between the values 22.40 and 11.20, and, besides, the ratio $$\bar{\varphi}_{r_4} : \bar{\varphi}_{r_5}$$

lies between the values 11.20 and 5.60, and finally the ratio $$\bar{\varphi}_{r_2} : \bar{\varphi}_{r_3}$$

lies between the values 5.60 and 2.80.

ALBRECHT WILHELM TRONNIER.